3,555,846
Patented Jan. 19, 1971

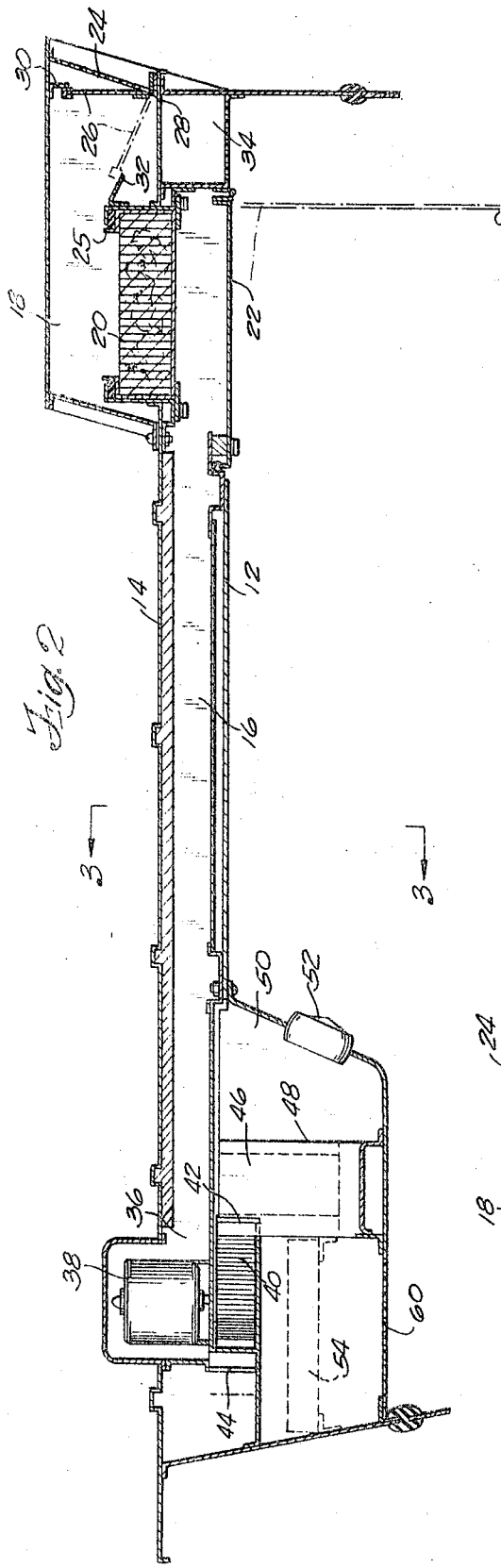
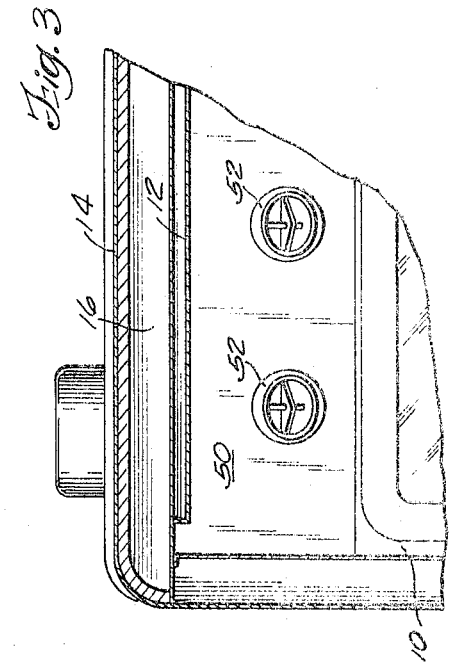
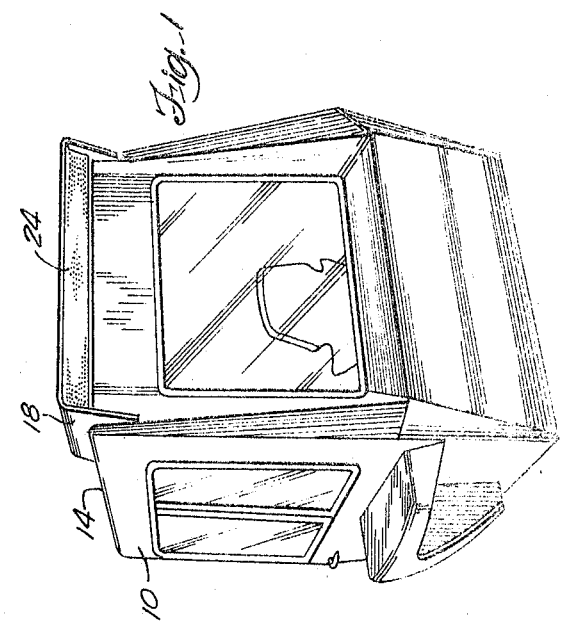

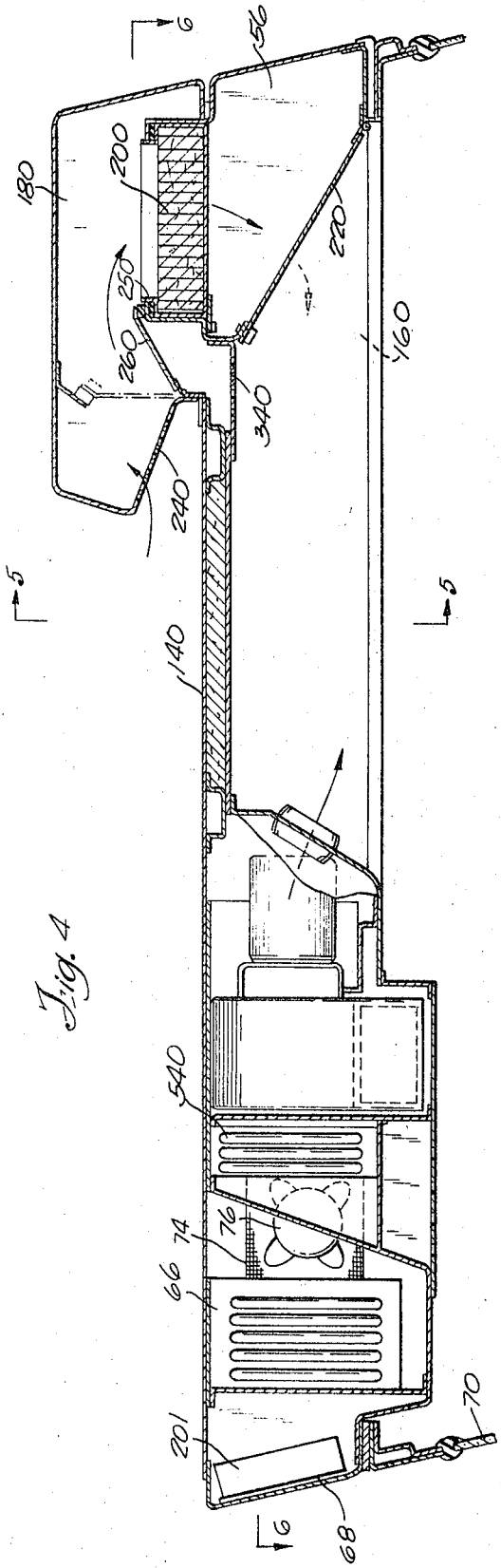
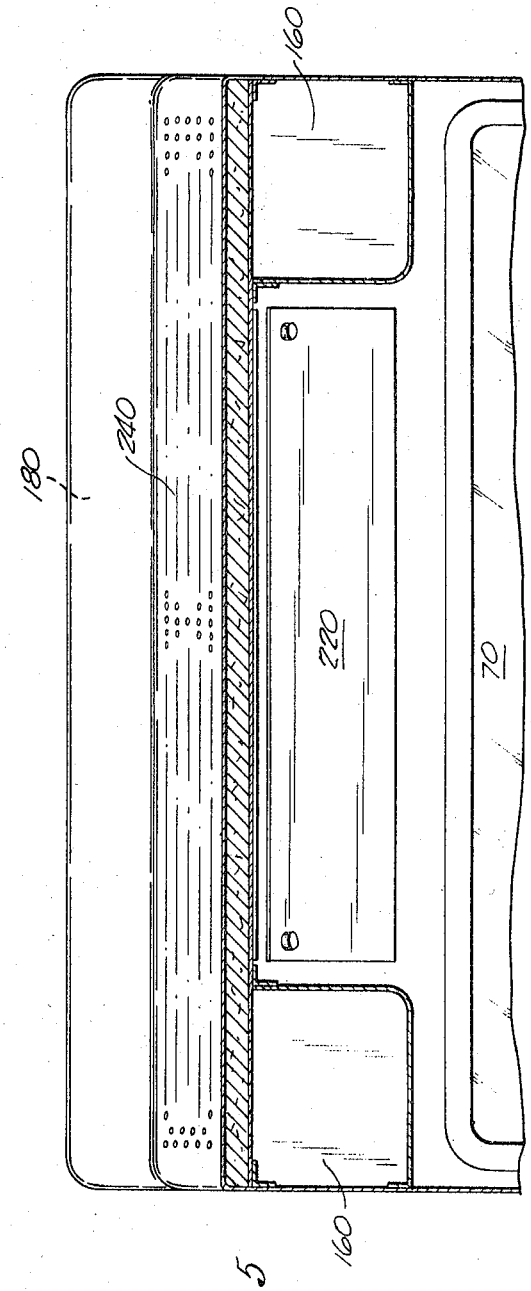

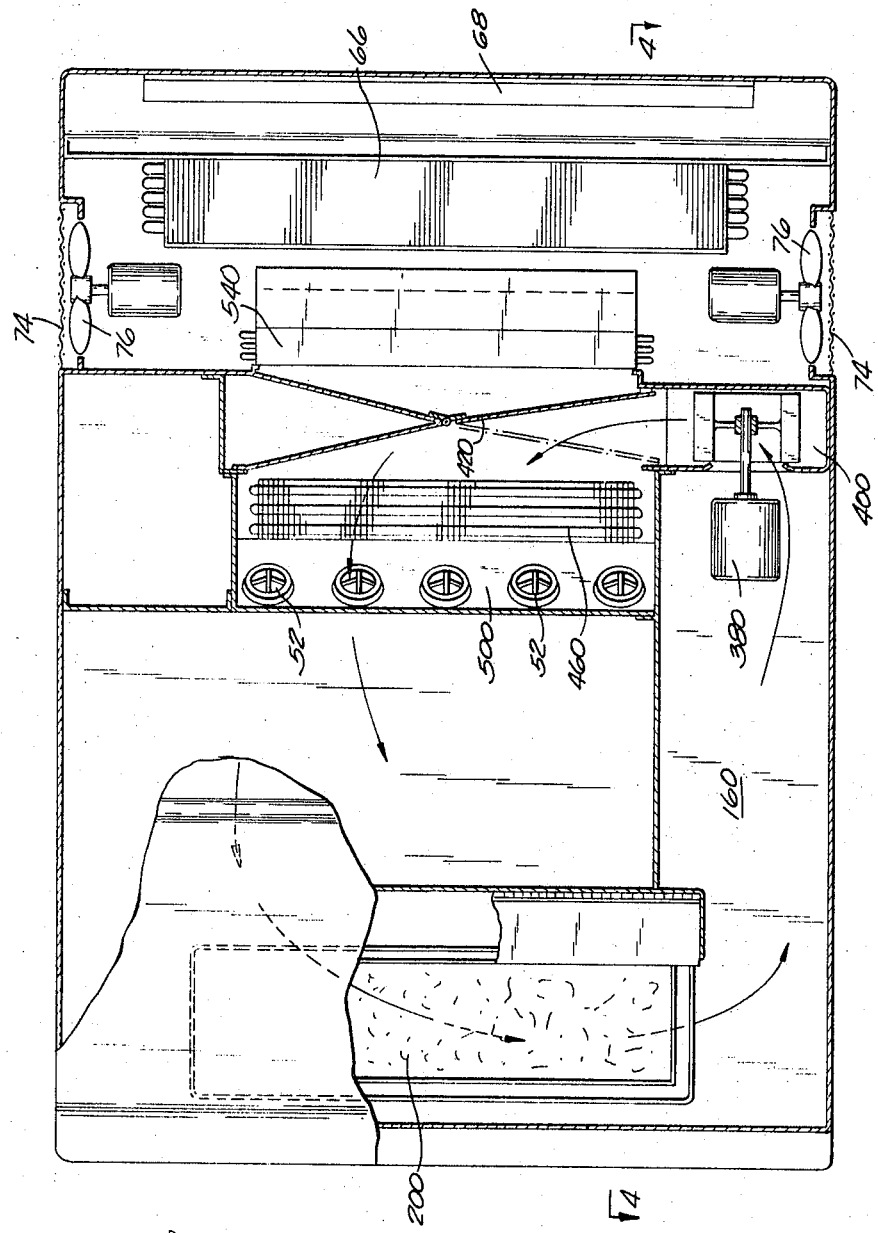

3,555,846
AIR-CONDITIONED VEHICLE CAB
Charles L. Harbeck, Pewaukee, and Raymond N. Sellon, Shorewood, Wis., assignors to Stolper Industries, Inc., Menomonee Falls, Wis., a corporation of Wisconsin
Filed Dec. 13, 1968, Ser. No. 783,570
Int. Cl. B60h 3/04
U.S. Cl. 62—244                                    11 Claims

ABSTRACT OF THE DISCLOSURE

Alternate arrangements are provided for introducing air from the rear of a vehicle cab, filtering such air at the rear of the cab and passing such air forwardly between the cab roof and ceiling, or through a duct along the sides of the space between the roof and ceiling toward air-condition means over the drivers' compartment at the front of the cab. The "air-conditioning means" comprises any arrangement for heating, cooling or ventilating or pressurizing the cab either through direct use of such external air or by recirculating cab air.

BACKGROUND OF INVENTION

Reference is made to copending applications of assignee, Ser. No. 711,687, filed Mar. 8, 1968, entitled Air Conditioner for Heating, Cooling, and Pressurizing Vehicle Cabs, and Ser. No. 751,097, filed Mar. 21, 1968, entitled Vehicle Cab Ventilator.

In almost all cab air-conditioning devices, the air is admitted at the front of the cab.

SUMMARY OF INVENTION

To provide numerous advantages, this invention contemplates that the air be admitted either through a forwardly directed screen or a rearwardly directed screen in an elevated filter compartment at the top and rear of the cab. It is found that this arrangement facilitates filter changes and has the further advantage that the air which is either recirculated or newly to be conditioned will traverse a space or duct between the cab roof and the ceiling of the cab, where it tends to protect the cab occupant or occupants from excessively hot or cold temperatures of the roof.

A further advantage of the invention consists in the facility with which adequate space may be provided within the somewhat narrow confines of the driver's compartment for accommodating the fan and heat exchangers required for the conditioning apparatus. It is helpful to have the filter removed to the rear. It may be noted, further, that the passages traversed by the air can be larger and the changes of direction of the air less abrupt and, moreover, separate fan and air inlets and outlets can readily be provided for the condenser of a refrigerating mechanism, if such is required.

BRIEF DESCRIPTION OF DRAWINGS

FIG. 1 is a view in three-quarter perspective of a cab embodying the invention.

FIG. 2 is a view of the cab of FIG. 1 on an enlarged scale and in longitudinal section.

FIG. 3 is a fragmentary detail view taken in transverse section on the line 3—3 of FIG. 2.

FIG. 4 is a view in longitudinal section through a modified embodiment of the invention on the line 4—4 of FIG. 6 with portions broken away.

FIG. 5 is a detail view in cross section on the line 5—5 of FIG. 4.

FIG. 6 is a view partially in plan and partially in horizontal section on the line 6—6 of FIG. 4, with portions broken away.

DETAILED DESCRIPTION

The cab of FIGS. 1, 2 and 3 has a double walled top in which the ceiling 12 is spaced below the insulated roof 14 to provide air passage 16 which is the full width of the cab and extends from rear to front.

At the rear of the cab, there is an elevated air receiving chamber 18 containing a filter 20 which can readily be removed and replaced through a trap door 22 in the ceiling. The rear wall of chamber 18 comprises a screen 24 which is preferably rearwardly inclined as best shown in FIG. 2. Straw, leaves or paper held by air currents on screen 24 will fall off as soon as air flow ceases. A valve 26 hinged at 28 is movable between the upright full line position and the inclined dotted line position shown in FIG. 2. In the upright position there is a seat 30 engaged by the valve. There is a seat 32 engaged by the valve in its inclined position. When the valve is upright as shown, the air which is received by filter 20 is air from the cab itself, which passes upwardly through the screen chamber 34. When the valve is engaged with seat 32, the recirculation of cab air is shut off and external air reaches the filter 20 through the screen 24. The frame of the filter includes a flange 25 enclosing a top surface for retention during handling of dirt trapped thereon.

Air passing the filter 20 is led through the passage 16 above cab ceiling 12 to a fan chamber 36 above the driver's compartment at the front of the cab. The motor 38 operates the blower fan 40 having an outlet control valve 42 and another outlet control valve 44. If the valve 42 is open, the air passes into the plenum chamber 46 and through the cooling heat exchanger 48, thence entering another plenum 50 which has a plurality of adjustable air flow directing baffles 52, as shown in FIG. 3. If the blower valve 42 is closed and the valve 44 is open, the air is directed to the heat exchanger 54 where it passes beneath chamber 46 into plenum chamber 60 for distribution of the heated air in the cab. Details of heat exchangers for unit cooling are not only disclosed in the companion applications above identified but are further disclosed in this application in FIGS. 4 to 6.

In the embodiment shown in FIG. 4, there will be found an illustration of an arrangement whereby only part of the ceiling is dropped below the insulated roof 140, air ducts 160 being provided at one or both sides of the cab leading from the filter 200 to the air-conditioning apparatus at the front of the cab. As in the embodiment first described, there is a filter chamber 180 on the top of the cab at the rear. However, in this instance, the fresh air inlet 240 is at the front rather than the rear of chamber 160. Like the inlet 24 shown in FIGS. 1 and 2, the inlet 240 is inclined to the vertical in such a way that cornhusks or leaves or paper will tend to be discharged whenever the air flow is cut off. As in the embodiment of FIG. 1, material trapped by the filter is retained on top of the filter during handling, the filter frame including a flange 250 for this purpose.

Between the ducts 160 extending along the left and right upper sides of the cab, there is a plenum chamber 56 which communicates with these ducts and is provided with a trap door at 220 which affords access to the filter for replacement thereof.

Likewise opening between the ducts 160 is a screen 340 which permits cab air to be recirculated through the filters 200 in the same manner as cab air was recirculated through the screen 34 of FIG. 2. Such recirculation is subject to control of a valve member 260 which is shown seated in a position in which all air traversing the filter is external air admitted through the screen 240. In the dotted line position of the member 260 the external air will be shut off and all air traversing the filter will be recirculated air from the cab.

FIG. 5 shows two of the ducts 160. FIG. 6 shows but one. It will be understood that if a second duct is required, it will preferably be provided with a duplicate blower 400. As shown in FIG. 6, the blower 400 is powered by motor 380 to receive air from the passage 160. Air expelled by blower 400 is controlled by a valve member 420 which is pivoted for movement between the full line position and the dotted line position of FIG. 6. In the full line position illustrated, the air is directed across a cooling coil 460 and thence into the plenum chamber 500 from which its flow is directed by the rotatably adjustable baffles 52 already described. If the valve 420 is in the position indicated in dotted lines in FIG. 6, the air discharged from the blower fan 400 will pass through the heat exchanger 540 where it will be warmed and will, in this instance, pass directly into the cab through the screen 60, as in FIG. 2.

Assuming that the air is to be refrigerated, it is necessary to provide a condenser for the coolant. In the construction shown in FIGS. 4 and 6, the condenser 66 is mounted at the rear of an air admission screen 68 disposed above the cab windshield 70. The air which passes through the condensing heat exchanger 66 to cool the compressed refrigerant is discharged by means of motor-operated fans 76 through screened openings 74 at one or both sides of the cab.

Cabs on agricultural vehicles, road machinery, tractors and other devices are frequently exposed to heavy quantities of dust. The location of the filter chamber in the top and at the rear of the cab has been found to be advantageous in eliminating much of the dust which might otherwise reach the filter. Because there are advantages in some vehicles in taking the air from the front of the chamber 180, and in other vehicles it is advantageous to take the air from the rear thereof, both of these possibilities are illustrated for alternative use.

When the air is taken from the outside, and filtered, and is forced into the cab by a blower or fan, the air in the interior of the cab becomes pressurized so that any leakage through doors or windows will be outwardly and will tend to prevent penetration by dust. Thus, even when the air is neither heated nor cooled, it is generally advantageous to pressurize the cab in this manner.

In both of the embodiments disclosed, there is important temperature control of the roof of the cab by passing ambient air through the overhead passages and by heating or cooling the roof as the case may be. Frequently the ambient air is much cooler than a roof exposed to the sun, thereby tending to cool the roof. Otherwise, the recirculation of air already tempered either by the heating or cooling apparatus disclosed will modify roof temperature. In the first embodiment disclosed, the duct from the filter to the air-conditioning devices is substantially coextensive with the roof. In the second disclosed embodiment, the ducts are confined to side portions of the roof but have substantial extent and are effective in thermally tempering the roof.

Use of an auxiliary filter 201 behind the condenser air inlet 68 is optional.

While the disposition of the various heat exchangers is preferred, it is to be understood that the invention is not limited in this regard.

What is claimed is:

1. A vehicle cab having overhead ventilating means opening into the cab adjacent its front and an air-receiving inlet adjacent its rear, and a roof provided with a passage affording communication between the air-receiving inlet means and the ventilating means, the air traversing said passage tending to modify the temperature of the roof.

2. A vehicle cab according to claim 1 in which the air-receiving inlet means includes a filter chamber projecting upwardly above the roof and provided with an inlet for ambient air, a filter in said chamber, said chamber communicating with said passage, and a further inlet from said cab below the roof also communicating with said passage for recirculation of air from the cab.

3. A vehicle cab according to claim 2 in which the filter chamber inlet for ambient air is forwardly disposed.

4. A vehicle cab according to claim 2 in which the filter chamber inlet for ambient air is rearwardly disposed.

5. A vehicle cab according to claim 2 in which the cab roof comprises a top and has a ceiling with a portion spaced beneath the top to provide such passage, such ceiling having a trap door through which said filter is replaceable.

6. A vehicle cab according to claim 2 in which substantially the entire ceiling is spaced below said roof, said passage being substantially the width of the cab.

7. A vehicle cab according to claim 2 in which the ventilating means comprises an air-conditioning heat exchanger, and fan means for forcing the air therethrough, said heat exchanger having an enclosure provided with a discharge vent into said cab.

8. A vehicle cab according to claim 7 in which the heat exchanger comprises an evaporator constituting a part of a refrigerating mechanism which also includes a condenser, said cab having a separate air inlet communicating with said condenser, and a separate air outlet from said condenser for the discharge of air heated thereby, and means for confining and for circulating the air from said condenser for discharge of such air from the cab.

9. A vehicle cab having a roof, air conditioning means at the front of the cab, an air plenum projecting above the roof at the rear of the cab, means providing a passage from the plenum to the air-conditioning means immediately beneath the roof of the cab, a filter in the plenum, the cab having a ceiling beneath the roof with a trap door through which said filter is accessible, the passage being substantially equal in width to the ceiling, said plenum having a first inlet from the exterior of the cab to receive ambient air and having a second inlet from the interior of the cab for recirculated air, and valve means for determining whether ambient external air or internal recirculated air will be admitted to the plenum for access to the filter.

10. A vehicle cab according to claim 9 in which the means for admitting ambient air to the plenum chamber comprises a screen having an inclination tending to discharge by gravity any accumulations of foreign matter thereon.

11. A vehicle cab according to claim 9 in which the filter is enclosed in a frame having means about its upper surface operable during removal of said filter through said trap door for retention on the filter of material trapped thereby.

References Cited

UNITED STATES PATENTS

| | | | |
|---|---|---|---|
| 433,942 | 8/1890 | Hughes | 165—42 |
| 2,032,572 | 3/1936 | Hammers | 62—259 |
| 2,203,814 | 6/1940 | Clements | 165—42 |
| 2,476,295 | 7/1949 | Hans | 165—42 |
| 2,541,921 | 2/1951 | Henney | 62—239 |

WILLIAM J. WYE, Primary Examiner

U.S. Cl. X.R.

62—259; 98—2.7; 165—42